(12) United States Patent
Zumberger et al.

(10) Patent No.: US 11,254,517 B1
(45) Date of Patent: Feb. 22, 2022

(54) LINER AND LOAD ASSEMBLY THEREFOR

(71) Applicant: Stolle Machinery Company, LLC, Centennial, CO (US)

(72) Inventors: Neil Albert Zumberger, Sidney, OH (US); Steven Todd Albright, Piqua, OH (US); Dennis Cornelius Stammen, Brookville, OH (US)

(73) Assignee: Stolle Machinery Company, LLC, Centennial, CO (US)

( * ) Notice: Subject to any disclaimer, the term of this patent is extended or adjusted under 35 U.S.C. 154(b) by 0 days.

(21) Appl. No.: 17/140,330

(22) Filed: Jan. 4, 2021

(51) Int. Cl.
*B65G 47/84* (2006.01)
*B05B 13/02* (2006.01)

(52) U.S. Cl.
CPC ........ *B65G 47/846* (2013.01); *B05B 13/0242* (2013.01); *B65G 2201/0252* (2013.01)

(58) Field of Classification Search
CPC ............ B65G 29/00; B65G 2201/0244; B65G 47/846; B65G 2201/0252; B05B 13/0242
USPC ........................................... 198/478.1, 473.1
See application file for complete search history.

(56) References Cited

U.S. PATENT DOCUMENTS

| | | | | |
|---|---|---|---|---|
| 1,124,145 | A * | 1/1915 | Koepp | B65G 47/846 198/473.1 |
| 1,234,729 | A * | 7/1917 | Champ | B65G 47/82 198/468.01 |
| 2,500,465 | A * | 3/1950 | Meyer | B67C 7/0006 198/478.1 |
| 3,036,693 | A * | 5/1962 | Glocker | G04D 1/0064 198/346.2 |
| 4,019,622 | A * | 4/1977 | Messervey | B07C 5/362 198/441 |
| 4,124,112 | A * | 11/1978 | Mohney | B65G 47/847 198/394 |
| 5,476,362 | A | 12/1995 | Kobak et al. | |
| 5,564,877 | A | 10/1996 | Hamilton | |
| 8,826,850 | B2 | 9/2014 | Zumberger et al. | |
| 2005/0011730 | A1* | 1/2005 | Wittmann | B65G 47/847 198/470.1 |
| 2010/0209604 | A1 | 8/2010 | Stammen | |

FOREIGN PATENT DOCUMENTS

DE    4225147    *  9/1993    ............. B65G 29/00

* cited by examiner

*Primary Examiner* — James R Bidwell
(74) *Attorney, Agent, or Firm* — Eckert Seamans Cherin & Mellott LLC

(57) ABSTRACT

A load assembly includes a supply mechanism structured to supply a plurality of container closures, and a conveyance assembly comprising a star wheel including a number of load pockets structured to receive the container closures and move the container closures from the supply mechanism to a processing assembly. The star wheel has an outer perimeter. Each of the load pockets is structured to receive a corresponding one of the container closures inboard of the outer perimeter of the star wheel.

17 Claims, 10 Drawing Sheets

LINER AND LOAD ASSEMBLY THEREFOR

BACKGROUND

Field

The disclosed concept relates generally to machinery for container closures and, more particularly, to liners for applying a coating material to container closures such as, for example, can ends. The disclosed concept also relates to load assemblies for liners.

BACKGROUND INFORMATION

It is known to apply sealant material, commonly referred to as compound, to the underside of container closures, for example, to facilitate subsequent sealing attachment (e.g., without limitation, seaming) of the closures to containers such as, for example, beer/beverage and food cans.

A rotary liner machine, for example, is used to line (i.e., apply sealant or compound) to container closures, commonly referred to as can lids, shells or can ends, at relatively high speed in relatively high volume applications. The rotary liner generally includes a base having a chuck assembly. A pivotal upper turret assembly is disposed over the chuck assembly and includes an electrical tank assembly, a rotary compound tank assembly, and a number of peripherally disposed fluid dispensing apparatus (e.g., sealant or compound guns). A lower turret assembly rotates the chucks. A downstacker delivers the can ends to a star wheel which, in turn, cooperates with corresponding chuck members of the chuck assembly to support and rotate the can ends relative to the fluid dispensing apparatus.

Specifically, the star wheel rotates the can ends onto the chuck members, which are raised by cams to receive the can ends. The chuck members then begin to rotate the can ends, which is commonly referred to as "pre-spin." Once the can ends reach the desired rotational velocity, the sealant is applied (e.g., without limitation, sprayed onto) to the can ends by the fluid dispensing apparatus. This is commonly referred to as the "spray time." After the sealant is applied, the can ends continue to be rotated for a relatively brief period of time to smooth out the sealant. This is commonly referred to as the "post spin time." Finally, the cams lower the chuck members and can ends, and each can end is removed and discharged from the rotary liner via an unloading guide.

Among other limitations, conventional rotary liner designs suffer from speed limitations in order to avoid damage to the container closures being processed. For example and without limitation, one known eight (8) head rotary liner is limited to about 262.5 revolutions per minute (rpm) at the turret. Therefore, using 202 diameter can ends as an example, the liner is capable of a maximum capacity of 2100 ends per minute (epm). It is desirable to increase the speed of the liner machine, in order to be able to increase the total volume of can ends. However, known load assembly components, such as for example and without limitation, existing star wheel and downstacker designs, are known to cause damage to can ends if speeds are increased beyond the foregoing (e.g., without limitation, great than about 262.5 rpm at the turret).

There is, therefore, room for improvement in liners and in load assemblies for liners.

SUMMARY

These needs and others are met by embodiments of the disclosed concept, which are directed to a liner and load assembly therefor. Among other advantages, the load assembly reduces forces applied to can ends, thereby allowing the line to operate at greater speeds and increased production volumes.

As one aspect of the disclosed concept, a load assembly comprises a supply mechanism structured to supply a plurality of container closures, and a conveyance assembly comprising a star wheel including a number of load pockets structured to receive the container closures and move the container closures from the supply mechanism to a processing assembly. The star wheel has an outer perimeter, and each of the load pockets is structured to receive a corresponding one of the container closures inboard of the outer perimeter of said star wheel.

The star wheel rotates at a first tangential velocity at the outer perimeter. The load pockets may extend radially inwardly from the outer perimeter and include a center point, wherein the star wheel rotates at a second tangential velocity at the center point, and the second tangential velocity may be less than the first tangential velocity. Each of the load pockets may be structured to completely receive a corresponding one of said container closures such that the entire container closure is disposed inboard of the outer perimeter of the star wheel.

The supply mechanism may comprise a downstacker structured to hold the container closures in a vertical stack. The conveyance assembly may further comprise a cam assembly, a guide member, and a pair of feed screws. The pair of feed screws may be structured to remove a container closure from the bottom of the vertical stack at a first elevation, and the cam assembly and the guide member may be structured to guide the container closure through a radial pathway as the container closure moves from the first elevation to a second elevation corresponding to a loaded position within a load pocket of the star wheel.

A liner employing the load assembly is also disclosed.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
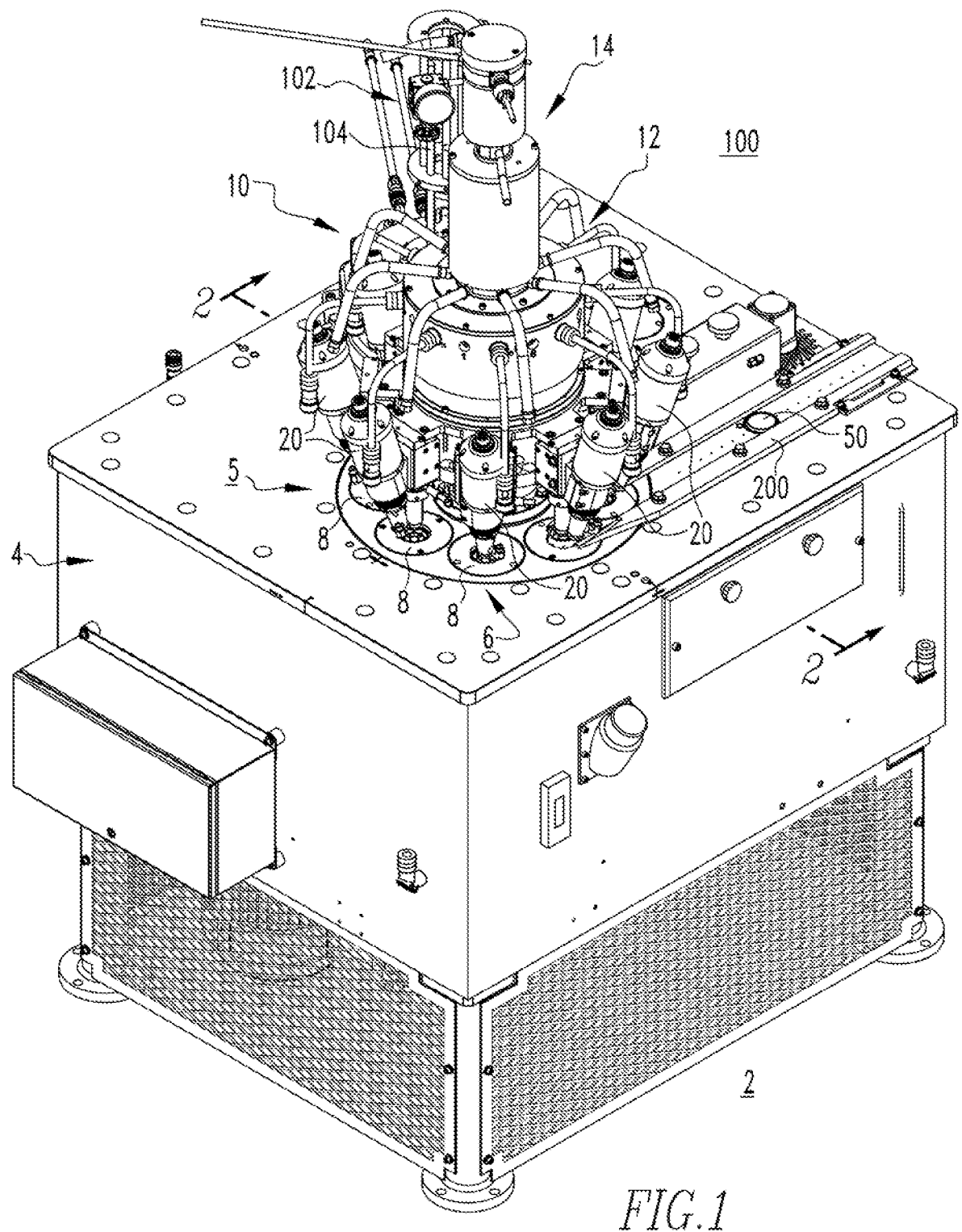
FIG. 1 is an isometric view of a liner and load assembly therefor in accordance with an embodiment of the disclosed concept.

It will be appreciated that although a load assembly in accordance the disclosed concept is shown and described herein as used with respect to a rotary liner for applying a sealant or compound to container closures, it could alternatively be employed to convey container closures with a wide variety of other types of equipment and machines (not shown) in other applications.

Directional phrases used herein, such as, for example, up, down, clockwise, counterclockwise and derivatives thereof, relate to the orientation of the elements shown in the drawings and are not limiting upon the claims unless expressly recited therein.

The specific elements illustrated in the drawings and described herein are simply exemplary embodiments of the disclosed concept. Accordingly, specific dimensions, orientations and other physical characteristics related to the embodiments disclosed herein are not to be considered limiting on the scope of the disclosed concept.

As employed herein, the terms "container closure," "can end," "shell," and/or "lid" are generally synonymous and are used substantially interchangeably to refer to any known or suitable closure member that is applied to (e.g., with limitation, seamed to) the open end of a container (e.g., without limitation, beer/beverage can; food can) to seal the contents of the container therein.

As employed herein, the terms "sealant" and/or "compound" are generally synonymous and are used substantially interchangeably to refer to any known or suitable coating that is applied to (e.g., with limitation, sprayed onto) the surface of a container closure.

As employed herein, the term "production volume" refers to the output of the liner and is preferably measured in container closures per minute, more commonly referred to in the industry as "ends per minute" (epm).

As employed herein, the statement that two or more parts are "coupled" together shall mean that the parts are joined together either directly or joined through one or more intermediate parts.

As employed herein, the term "number" shall mean one or an integer greater than one (i.e., a plurality).

Figure 2:
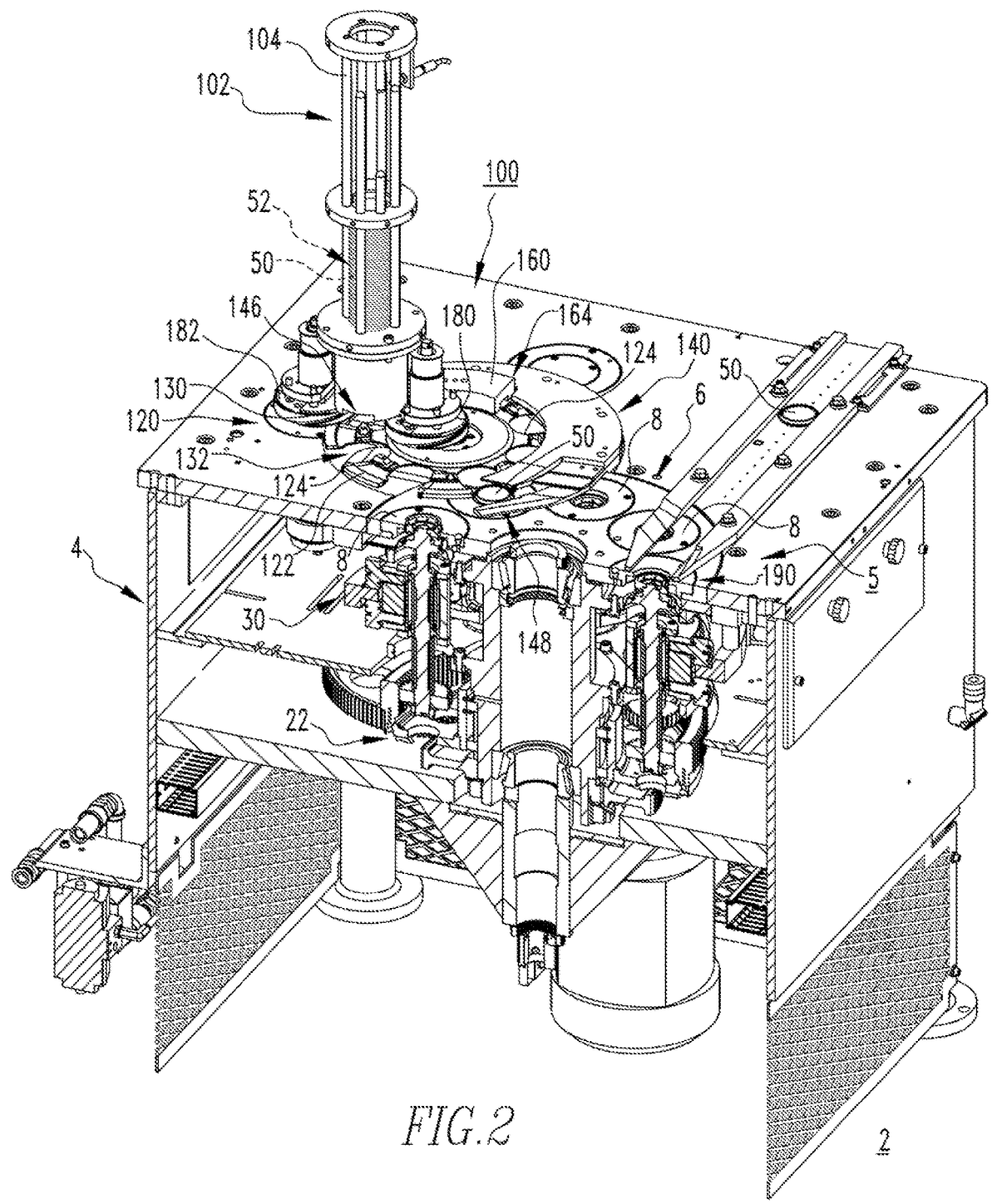
FIG. 2 is a section view taken along line 2-2 of FIG. 1, with certain components of the liner removed to better show hidden features of the load assembly.

A liner machine 2, such as for example and without limitation, the rotary liner machine 2 shown in FIGS. 1 and 2, is used for lining (i.e., applying sealant (not shown) or compound (not shown)) to can ends 50. The liner machine 2, commonly referred to simply as a "liner," employs a load assembly 100 (best shown in FIG. 2) in accordance with an embodiment of the disclosed concept.

As shown in FIG. 1, the liner 2 generally includes a base 4 having a processing assembly 5. The processing assembly includes a chuck assembly 6 having a number of rotatable chucks 8, and a pivotal upper turret assembly 10 disposed over the chuck assembly 6. The pivotal upper turret assembly 10 includes an electrical tank assembly 12, a rotary compound tank assembly 14, and a number of peripherally disposed fluid dispensing apparatus 20 (e.g., sealant or compound guns). A lower turret assembly 22, which is best shown in the section view of FIG. 2, is disposed within the base 4 and is configured to rotate the chucks 8. The example liner 2 includes eight (8) guns 20 with each gun 20 being associated with a corresponding rotatable chuck 8 of the chuck assembly 6. It will be appreciated, however, that any suitable alternative number and configuration (not shown) of chucks 8 and guns 20 or other fluid dispensing apparatus (not shown) could be employed without departing from the scope of the disclosed concept.

The load assembly 100 includes a supply mechanism 102, which in the example shown, is a downstacker 104. The downstacker 104 is structured to hold and supply a plurality of container closures 50. More specifically, as shown in simplified form in phantom line drawing in FIG. 2, the downstacker 104 is preferably structured to hold a plurality of container closures 50 arranged in a vertical stack 52. The load assembly 100 further includes a conveyance assembly 120 comprising a star wheel 122.

Figure 3:
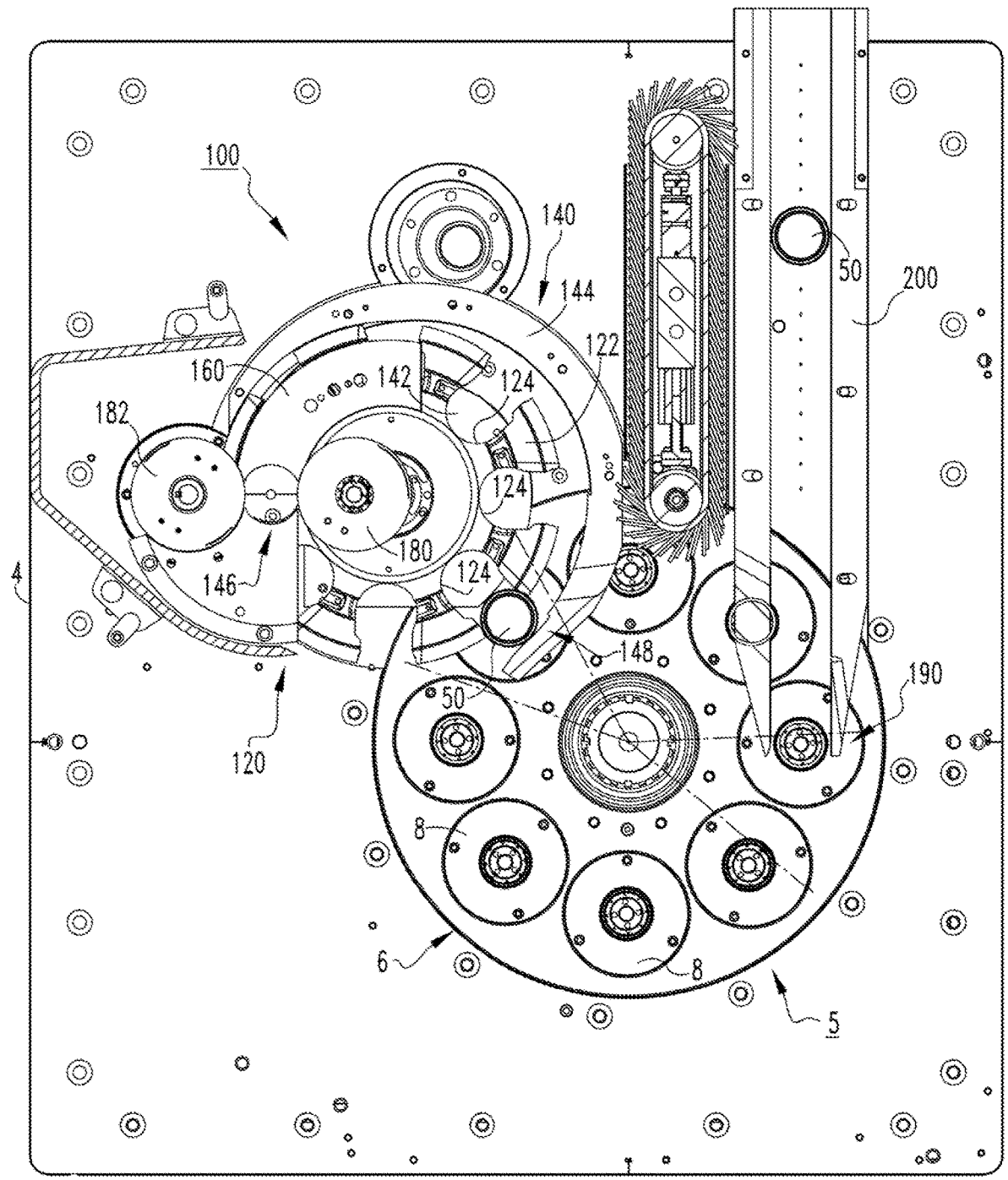
FIG. 3 is a top plan view of the liner and load assembly of FIG. 2.
Figure 4:
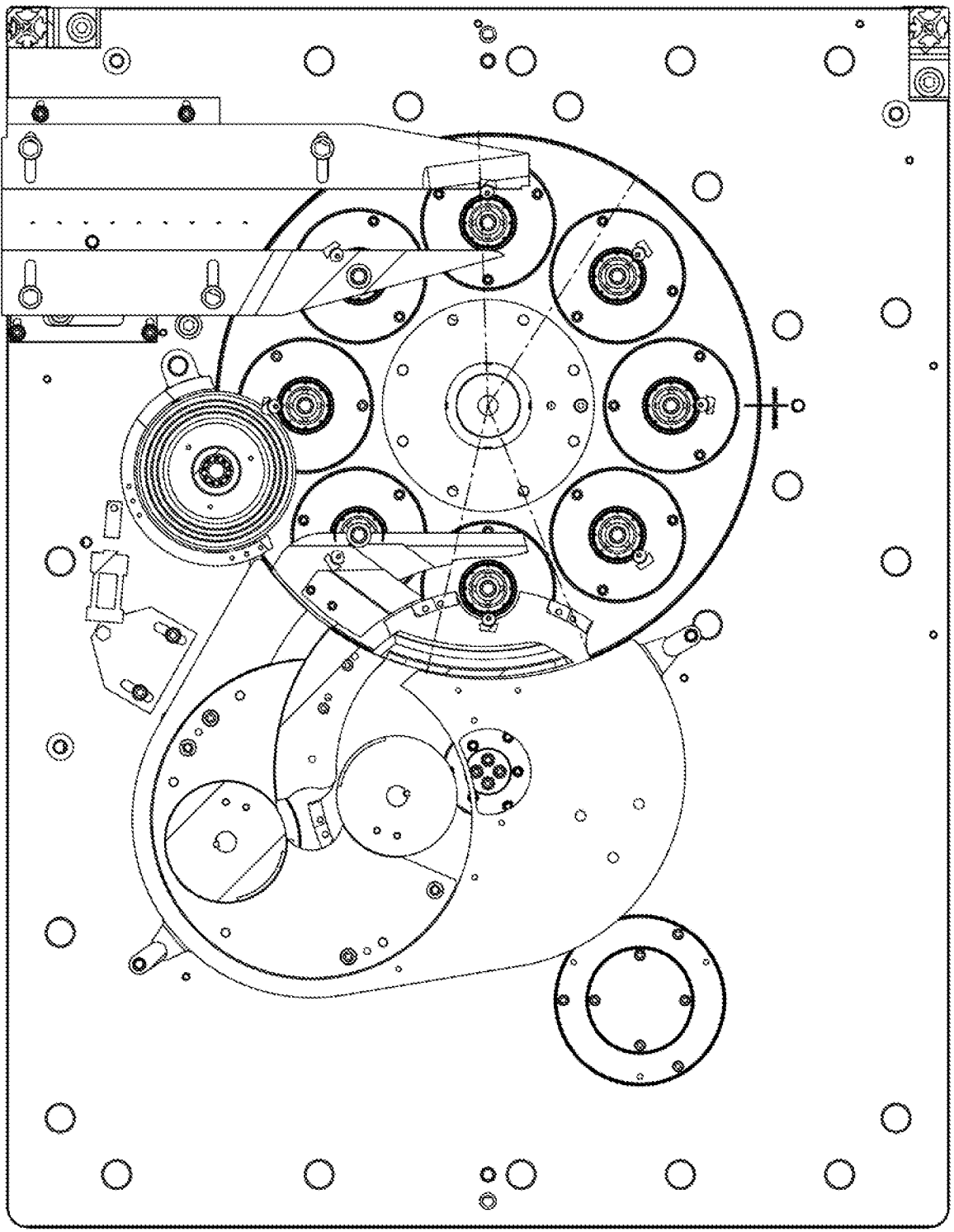
FIG. 4 is a top plan view of a prior art liner and load assembly provided for purposes of comparison to the liner and load assembly of FIG. 3.
Figure 5:
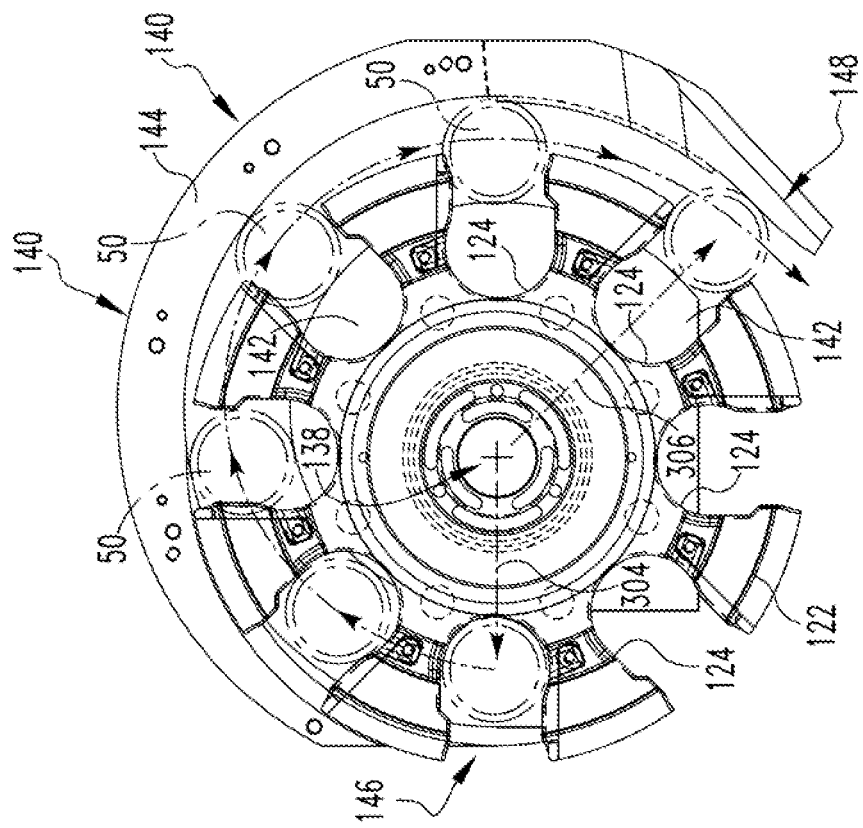
FIG. 5 is a top plan view of a portion of the load assembly of FIG. 3.
Figure 10:
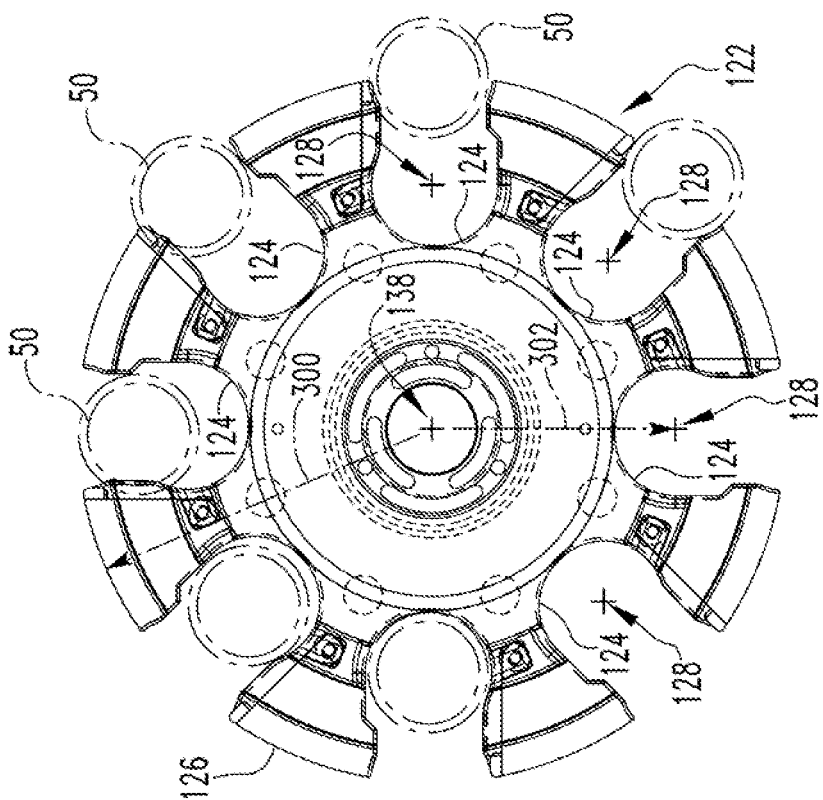
FIG. 10 is a top plan view of a star wheel for a load assembly in accordance with an embodiment of the disclosed concept.

As best shown in FIGS. 3, 5 and 10, the star wheel 122 includes a number of load pockets 124 structured to receive the container closures 50 and move the container closures 50 from the downstacker 104 to the aforementioned processing assembly 5. This star wheel 122 has an outer perimeter 126. Each of the load pockets 124 is structured to receive a corresponding one of the container closures 50 inboard of the outer perimeter 126 of the star wheel 122, as shown for example in FIGS. 5 and 10. Each load pocket 124 of the star wheel 122 has a center point 128 (FIG. 10). It will be appreciated that the star wheel 122 rotates at a first tangential velocity at the outer perimeter 126, and at a second tangential velocity at the center point 128 of the load pockets 124, which is less than the first tangential velocity at the outer perimeter 126. Accordingly, by moving the load pockets 124 inboard from the outer perimeter 126 of the star wheel 122, the tangential speed at the inboard location (i.e., center point 128) is reduced and, in turn, the forces applied to the container closures 50, are reduced. Stated differently, the star wheel 122 has a center point 138, a first radial dimension 300 measured from the center point 138 of the star wheel 122 to the outer perimeter 126 of the star wheel 122, and a second, smaller radial dimension 302 measured from the center point 138 of the star wheel 122 to the center point 128 of the load pockets 124 of the star wheel.

Figure 6:
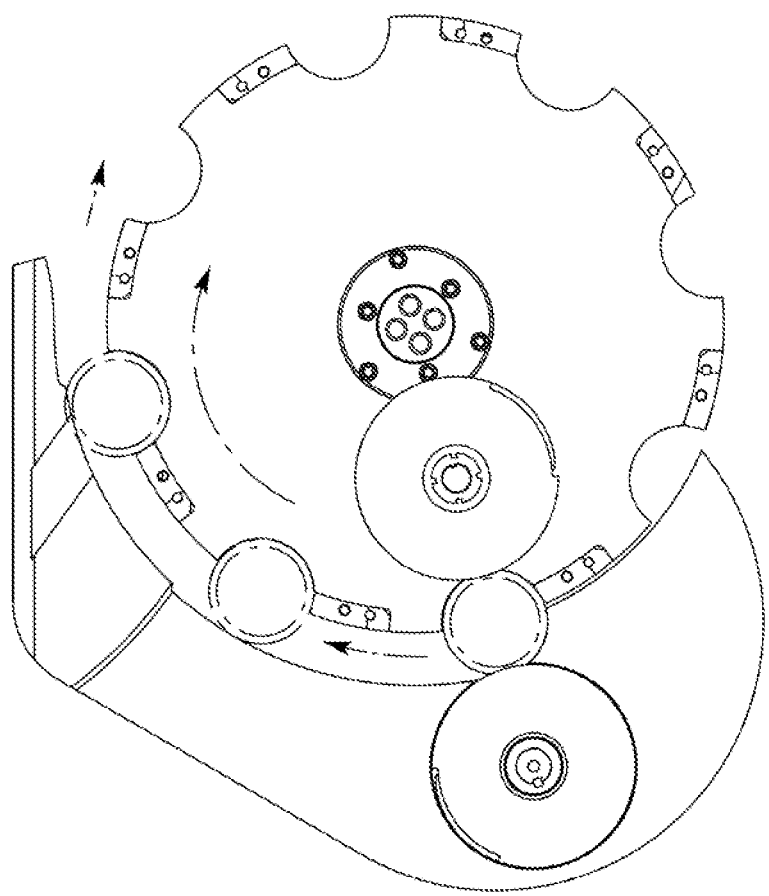
FIG. 6 is a top plan view of a portion of a prior art load assembly provided for purposes of comparison to the load assembly of FIG. 5.
Figure 9:
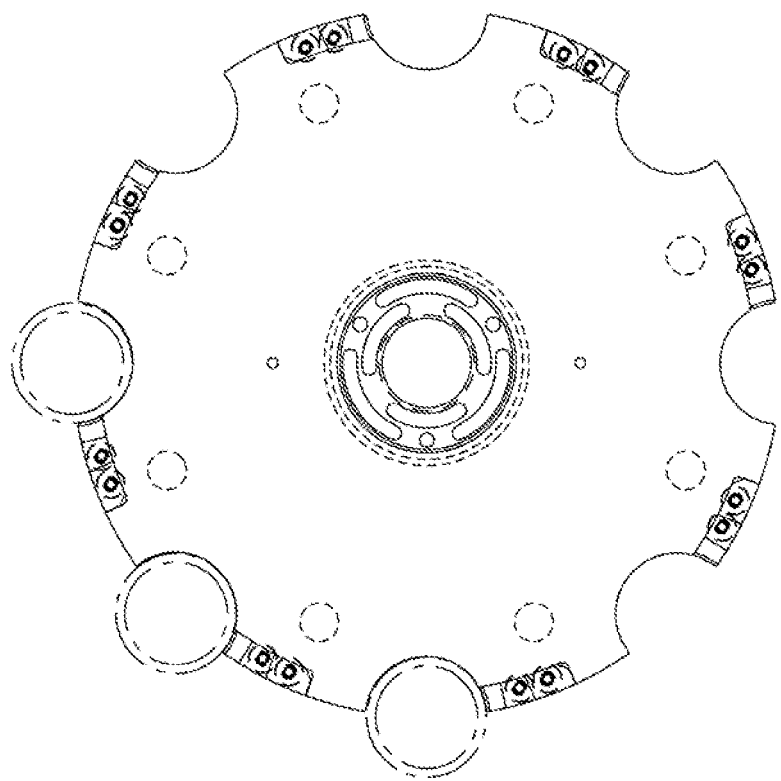
FIG. 9 is a top plan view of the star wheel for a prior art load assembly.

Accordingly, the disclosed star wheel 122 has a significantly different design compared to known prior art star wheels (FIGS. 6 and 9), wherein the loaded position of the container closures 50 has been moved a relatively significant distance inboard from the outer perimeter 126 of the star wheel 122, thereby reducing associated forces and stresses on the container closures 50. More specifically, as used herein "inboard from the outer perimeter 126" means at least the majority (i.e., more than half) of the container closures 50 are disposed inboard (i.e., inward with respect to) the outer perimeter 126 unlike known prior art star wheel designs such as the star wheel shown in FIG. 9. Accordingly, it will be appreciated that although the non-limiting example embodiment shown in FIGS. 5 and 9 includes load pockets 124 structured to completely receive the container closures 50 such that the entire container closure 50 is disposed inboard of the outer perimeter 126 of the star wheel 122 when it is fully loaded in the load pocket 124, alternative embodiments (not shown) where the container closures 50 are disposed inboard from the outer perimeter 126 a lesser amount, are also explicitly within the scope of the disclosed concept. Comparing the prior art star wheel shown in FIGS. 6 and 9, to the disclosed star wheel 122 shown in FIGS. 5 and 10, it will be appreciated that the load pocket 124 design of the disclosed star wheel 122 is a significant departure from conventional star wheel designs which had shallow load pockets such that the container closures, even when loaded, were disposed at the outer perimeter of the star wheel, as shown in prior art FIGS. 6 and 9, and, therefore, rotated at the faster tangential velocity associated with this outboard location.

Among other advantages, because the forces on the container closures 50 at the inboard location of the star wheel load pockets 124 is lower, the speed of the star wheel 122 can, in turn, be increased thus allowing the liner 2 to be operated at a faster processing speed with increased production volume. In accordance with one non-limiting example embodiment, if the liner is an eight (8) head rotary liner 2 configured to line standard 202 diameter container closures, the turret speed can be increased to up to approximately 400 revolutions per minute (rpm), or more. This is a significant increase compared to a conventional liner where turret speed was limited to approximately 262 rpm else excessive forces would result in damage to the container closures 50 as noted above. Therefore, by way of example, and without limitation, if the disclosed liner 2 is operated with a turret speed of approximately 375 rpm, the production volume of the liner 2 will be increased to approximately 3,000 ends per minute (epm) compared to the production volume capacity of approximately 2,100 epm for a conventional rotary liner (FIGS. 4, 6, 9, 12 and 14) operating at the conventional maximum turret speed of approximately 262 rpm.

In addition to the aforementioned enhancements of the star wheel 122, the disclosed liner 2 also includes a number of additional unique features which enable container closures 50 to be loaded into the star wheel 122 "gently" or "softly" (i.e., with reduced force compared to the prior art) in both the radial direction and the vertical direction. It is these features, individually, as well as in combination, allow the liner 2 to be operated at a relatively higher rate of speed than prior art liners, without causing damage to the container closures 50 to further improve production volume.

More specifically, as shown in FIGS. 2 and 3, the load assembly 100 preferably further includes a cam assembly 140, a guide member 160, and a pair of feed screws 180, 182. The pair of feed screws 180, 182 is structured to remove (e.g., peel off) a container closure 50 from the bottom of the vertical stack 52 of container closures 50 (shown in simplified form and phantom line drawing in FIG. 2) in the downstacker 124. This occurs at a first elevation 130. The cam assembly 140 and the guide member 160 are structured to then guide the container closure 50 through a radial pathway as the container closure 50 moves from the first elevation 130 to a second, lower elevation 132 corresponding to the loaded position within a corresponding load pocket 124 of the star wheel 122. That is, at least one of the cam assembly 140 and guide member 160 is structured to completely guide and control movement of container closures 50 the entire time as they are moved from the first elevation 130 to the second, lower elevation 132 over a radial distance 150. As will be appreciated with comparison of FIG. 3 to prior art FIG. 4, this radial distance 150, or lead in radius, is relatively significantly increased from prior art liners. For example and without limitation, in one non-limiting example embodiment of the disclosed concept, the lead in radius 150 is at least 5 degrees, and preferably is about 45 degrees.

Figure 12:
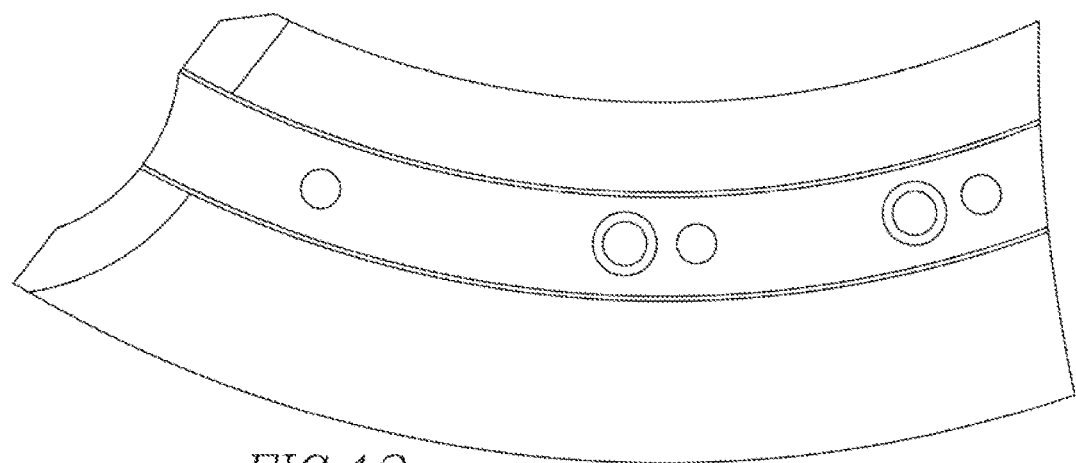
FIG. 12 is a top plan view of a portion of the guide for a prior art load assembly.
Figure 13:
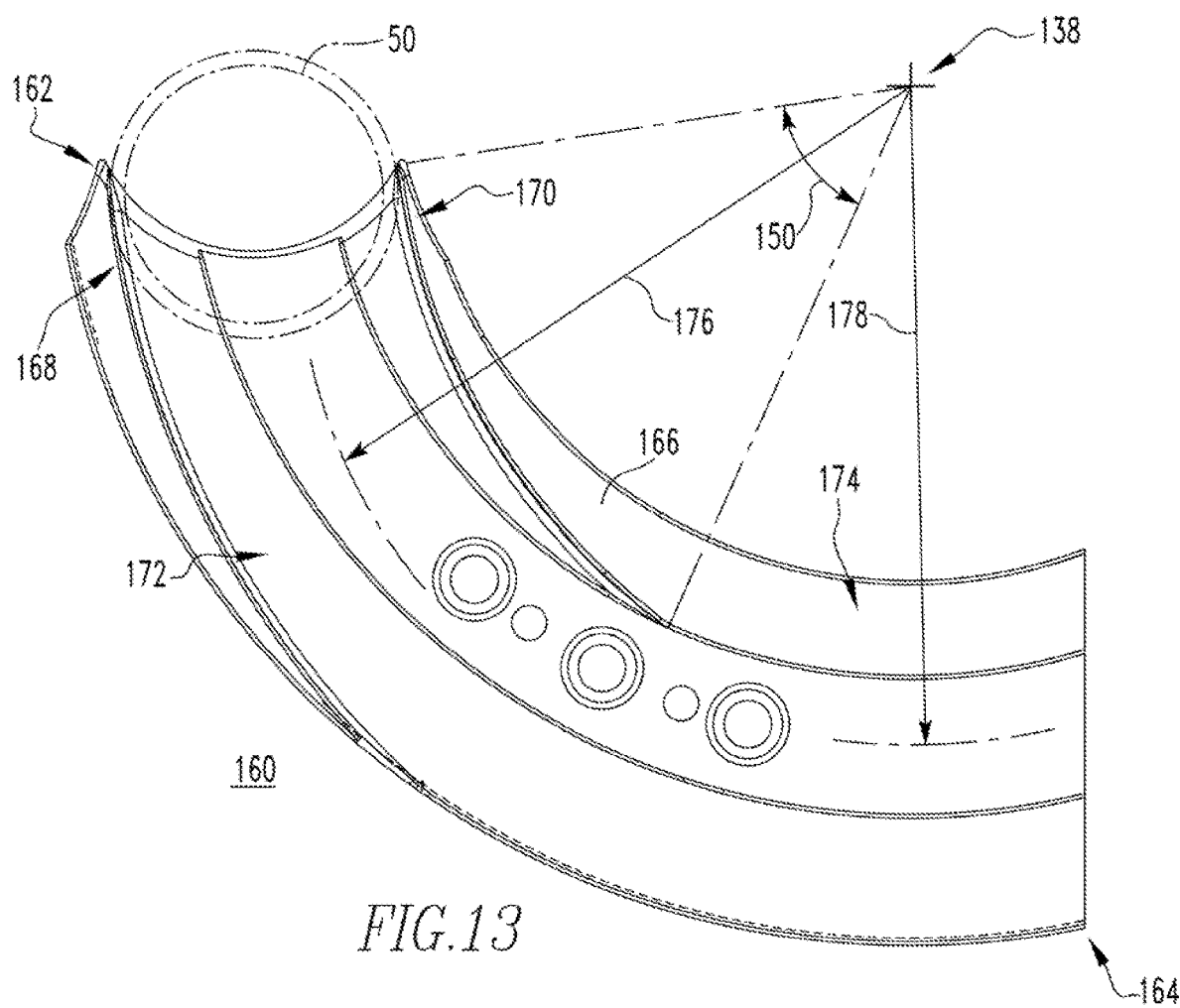
FIG. 13 is a top plan view of a portion of a guide for a load assembly in accordance with an embodiment the disclosed concept.
Figure 14:
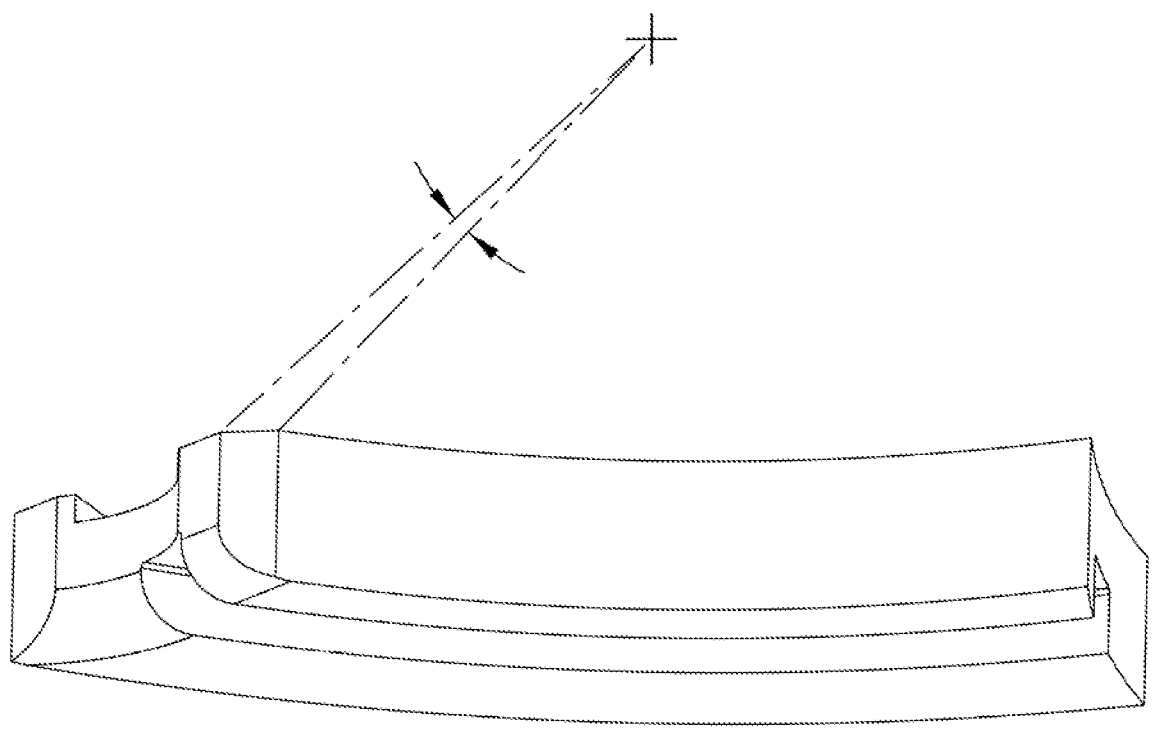
FIG. 14 is another isometric view of the portion of a prior art guide of FIG. 12.
Figure 15:
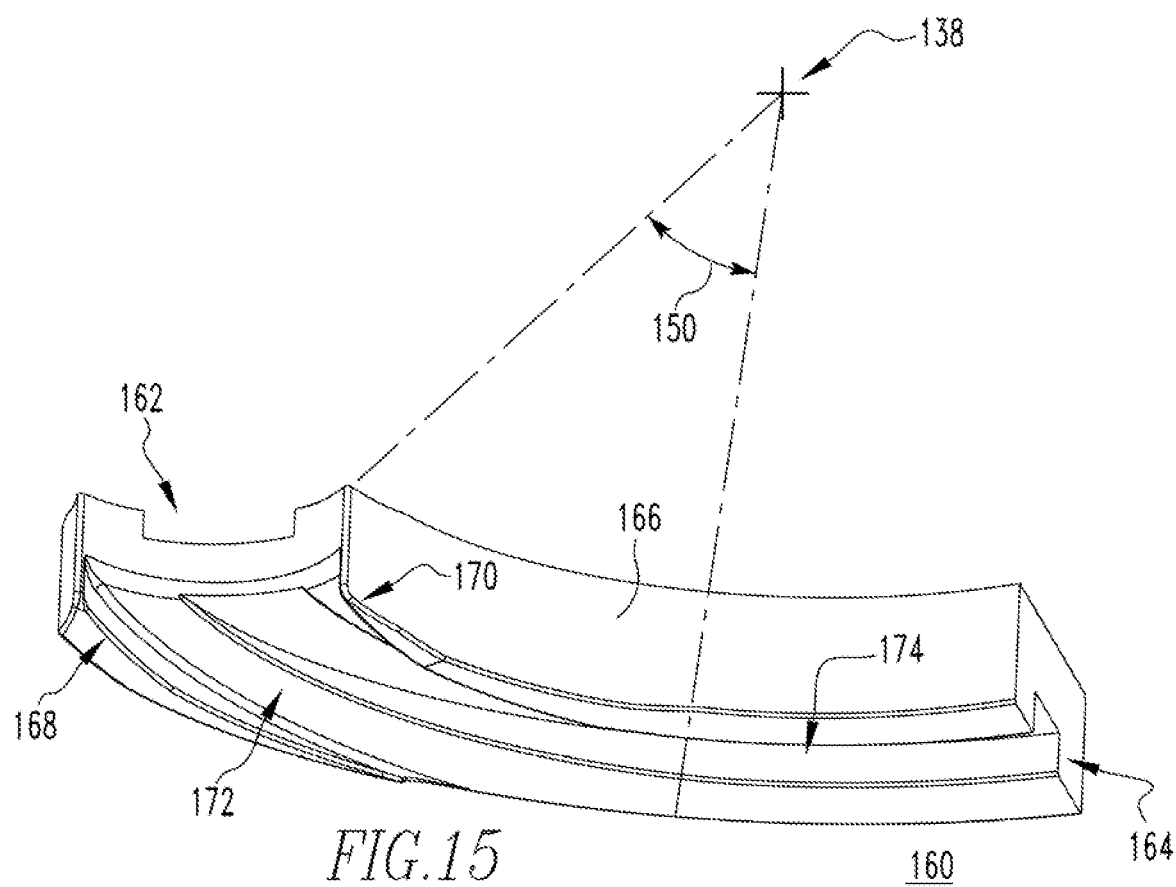
FIG. 15 is another isometric view of the portion of the guide of FIG. 13.

Continuing to refer to FIG. 2, and also to FIGS. 13 and 15, will be appreciated that the example guide member 160 includes a first end 162, a second end 164, and an arcuate body portion 166 extending therebetween. The arcuate body portion 166 includes first and second opposing edges 168, 170. The guide member 160 is structured to guide the container closures 50 between the first edge 168 and the second edge 170, as shown in simplified form and phantom line drawing in FIG. 13. The arcuate body portion 166 of the example guide member 160 includes a first segment 172 and a second segment 174, wherein the first segment 172 has a first radius of curvature 176, and the second segment 174 as a second radius of curvature 178, which is different than the first radius of curvature 176. That is, the first radius of curvature 176 is sharper, or more acute, than the second radius of curvature 178. This unique structure functions to achieve the aforementioned transition of moving the container closures 50 radially inwardly from the initial supply point 146 (FIGS. 2 and 5) at the downstacker 124 (FIGS. 1 and 2) to the inward location of the star wheel load pocket 124. At the same time, the unique structure of the guide member 160 also functions to completely control and guide, and therefore minimize forces upon and protect, the container closures 50 as they also transition vertically from the first elevation 130 at the supply point 146 (FIGS. 2 and 5) at the bottom of the downstacker 124 (FIGS. 1 and 2) to the second, lower elevation 132 at the star wheel load pocket 124. The aforementioned lead in radius 150, which is measured from the center point 138 of the star wheel 122, is also shown in FIGS. 13 and 15. It will be appreciated, therefore, that the guide member 160 of the disclosed load assembly 100 is significantly different from the prior art (FIGS. 12 and 14).

Figure 11:
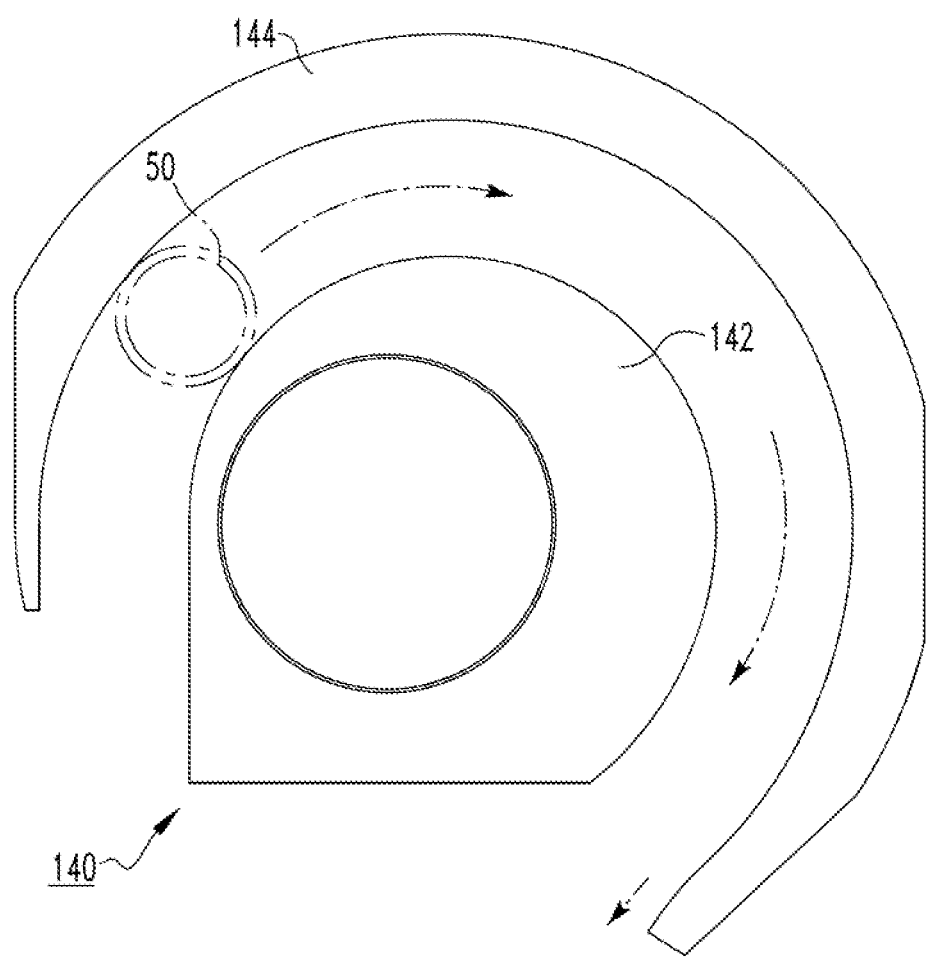
FIG. 11 is a top plan view of a cam assembly for a load assembly in accordance with an embodiment of the disclosed concept.

The aforementioned cam assembly 140 also functions to control and guide movement of the container closures 50 in a beneficial and unique manner. Specifically, the cam assembly 140 of the disclosed load assembly 100 preferably includes an inner cam 142 (partially shown in FIGS. 3 and 5) and an outer cam 144 spaced apart from the inner cam 142 to define a space therebetween, as best shown in FIG. 11. Thus, container closures 50 (one container closure 50 is shown in simplified form in phantom line drawing in FIG. 11) are received in the space between the inner and outer cams 142, 144 as the cam assembly 140 guides and controls movement of the container closures 50 in the manner shown in FIG. 5. More specifically, as the star wheel 122 rotates, the cam assembly 140 guides the movement of the container closures 50 from the aforementioned supply point 146 at the downstacker 104 (FIGS. 1 and 2) to a transfer point 148 at the processing assembly 5 and, in particular, to the chuck members 8 of the chuck assembly 6, as shown in FIG. 3.

Referring to FIG. 5, it will be appreciated that the supply point 146 is disposed at a first radius 304, measured from the center point 138 of the star wheel 122, and that the transfer point 148 is disposed at a second, larger radius 306, which is likewise measured from the center point 138 of the star wheel 122. Thus, it will be appreciated that the cam assembly 140 is structured to guide movement of the container closures 50 radially outwardly from the first radius 304 to the second radius 306 over the course of the load path shown in FIG. 5.

Figure 8:
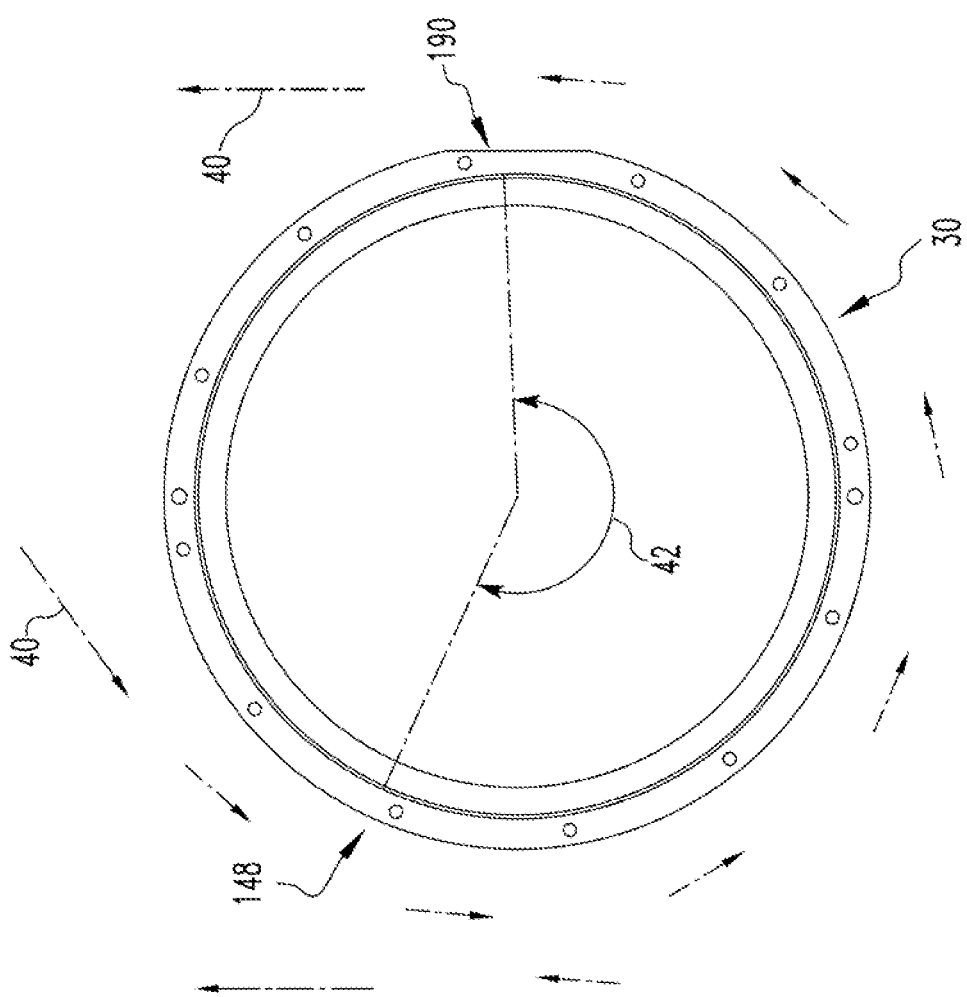
FIG. 8 is a top plan view of a cam track design for a load assembly in accordance with an embodiment of the disclosed concept.
Figure 7:
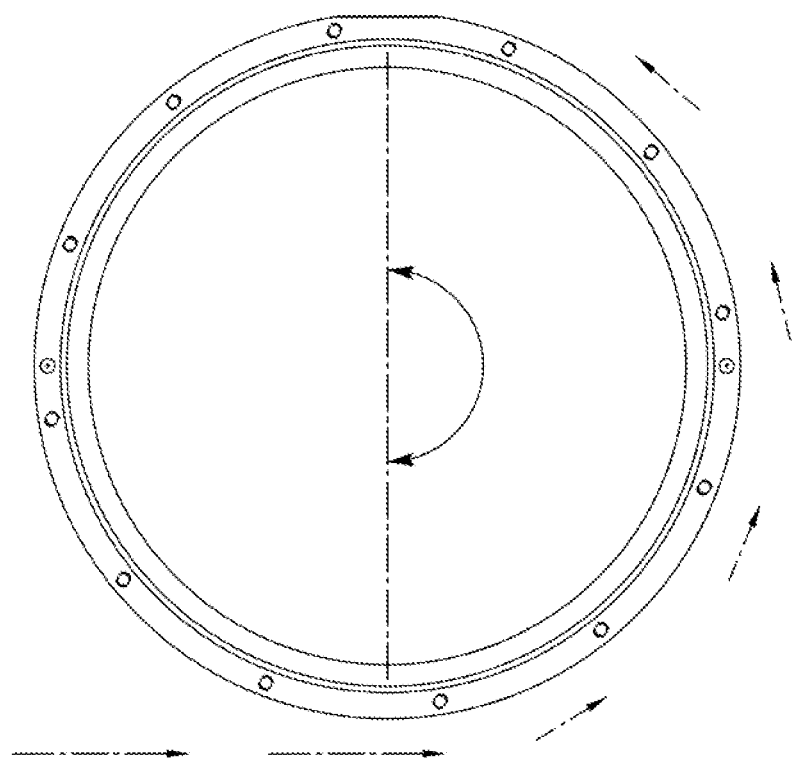
FIG. 7 is a top plan view of the cam track design for a prior art load assembly.

Referring to FIGS. 2, 3 and 8, the conveyance assembly 120 of the disclosed load assembly 100 further includes a discharge guide 200 (FIGS. 2 and 3) structured to discharge the container closures 50 from the processing assembly 5 at a discharge point 190. In addition to the aforementioned turret assembly 22, the processing assembly 5 further includes a substantially circular cam track 30. The substantially circular cam track 30 (FIGS. 2 and 8) is disposed beneath, and generally corresponds to, the chuck members 8 of the chuck assembly 6. In operation, the substantially circular cam track 30 defines a radial processing pathway 40 (FIG. 8), which extends from the transfer point 148 where container closures 50 are transferred from the star wheel 122 to a corresponding chuck member 8 of the processing assembly 5 all the way to the discharge point 190 where the container closures 50 are discharged via the discharge guide 200, as shown in FIG. 3. In the non-limiting example embodiment shown in FIG. 8, the processing pathway 40 extends a radial angle 42 (measured as shown in FIG. 8) of more than 180 degrees, and preferably extends approximately 225 degrees. This angle 42, and the associated additional length of the processing pathway 40 compared, for example, to the prior art cam track shown in FIG. 7, is necessary to ensure the required amount of processing time is provided at the increased speeds of the disclosed liner 2.

Accordingly, among other benefits, it will be appreciated that the disclosed load assembly 100 provides a number of unique features that individually, and in combination, function to reduce or "soften" loads applied to container closures 50 and thereby enables the operating speed of the liner 2 to be increased, which advantageously improves production volume.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A load assembly comprising:
    a supply mechanism structured to supply a plurality of container closures; and
    a conveyance assembly comprising a star wheel including a number of load pockets structured to receive the container closures and move the container closures from the supply mechanism to a processing assembly,
    wherein the star wheel has an outer perimeter,
    wherein each of the load pockets is structured to receive a corresponding one of the container closures inboard of the outer perimeter of said star wheel,
    wherein the supply mechanism comprises a downstacker structured to hold the container closures in a vertical stack, and
    wherein the conveyance assembly further comprises a cam assembly, a guide member, and a pair of feed screws; wherein the pair of feed screws is structured to remove a container closure from the bottom of the vertical stack at a first elevation; and wherein the cam assembly and the guide member are structured to guide the container closure through a radial pathway as the container closure moves from the first elevation to a second elevation corresponding to a loaded position within a load pocket of the star wheel.

2. The load assembly of claim 1 wherein the star wheel rotates at a first tangential velocity at the outer perimeter; wherein the load pockets each extend radially inwardly from the outer perimeter and include a center point; wherein the star wheel rotates at a second tangential velocity at the center point; and wherein the second tangential velocity is less than the first tangential velocity.

3. The load assembly of claim 1 wherein each of said load pockets is structured to completely receive a corresponding one of said container closures such that the entire container closure is disposed inboard of the outer perimeter of the star wheel.

4. The load assembly of claim 1 wherein at least one of the guide member and the cam assembly is structured to completely guide and control movement of the container closures from the first elevation to the second elevation over a radial distance.

5. The load assembly of claim 4 wherein the radial distance comprises a lead in radius; and wherein the lead in radius corresponds to a rotation of the star wheel of at least 5 degrees.

6. The load assembly of claim 4 wherein the guide member includes a first end, a second end, and an arcuate body portion extending between the first end and the second end; wherein the arcuate body portion includes a first edge and a second edge disposed opposite the first edge; and wherein the guide member is structured to guide the container closures between the first edge and the second edge.

7. The load assembly of claim 6 wherein the arcuate body portion includes a first segment and a second segment; wherein the first segment has a first radius of curvature; and wherein the second segment has a second radius of curvature different than the first radius of curvature.

8. The load assembly of claim 1 wherein the cam assembly includes an inner cam and an outer cam spaced apart from the inner cam to define a space therebetween; and wherein the cam assembly is structured to guide and control the movement of the container closures.

9. The load assembly of claim 8 wherein the cam assembly is structured to move the container closures from a supply point at the downstacker to a transfer point at the processing assembly; wherein the supply point is disposed at a first radius; wherein the transfer point is disposed at a second radius; and wherein the second radius of the transfer point is larger than the first radius of the supply point.

10. The load assembly of claim 9 wherein the conveyance assembly further comprises a discharge guide structured to discharge the container closures from the processing assembly at a discharge point; wherein the processing assembly comprises a turret assembly and a substantially circular cam track; wherein the substantially circular cam track defines a radial processing pathway that extends from the transfer point to the discharge point; and wherein the radial processing pathway extends more than 180 degrees.

11. A liner comprising:
    a base;
    a processing assembly operatively coupled to the base; and
    a load assembly comprising:
        a supply mechanism structured to supply a plurality of container closures, and
        a conveyance assembly comprising a star wheel including a number of load pockets structured to receive the container closures and move the container closures from the supply mechanism to the processing assembly,
    wherein the star wheel has an outer perimeter, wherein each of the load pockets is structured to receive a corresponding one of the container closures inboard of the outer perimeter of said star wheel, and wherein the supply mechanism comprises a downstacker structured to hold the container closures in a vertical stack; wherein the conveyance assembly further comprises a cam assembly, a guide member, and a pair of feed screws; wherein the pair of feed screws is structured to remove a container closure from the bottom of the vertical stack at a first elevation; and wherein the cam assembly and the guide member are structured to guide the container closure through a radial pathway as the container closure moves from the first elevation to a second elevation corresponding to a loaded position within a load pocket of the star wheel.

12. The liner of claim 11 wherein the star wheel rotates at a first tangential velocity at the outer perimeter; wherein the load pockets each extend radially inwardly from the outer perimeter and include a center point; wherein the star wheel rotates at a second tangential velocity at the center point; and wherein the second tangential velocity is less than the first tangential velocity.

13. The liner of claim 11 wherein each of said load pockets is structured to completely receive a corresponding one of said container closures such that the entire container closure is disposed inboard of the outer perimeter of the star wheel.

14. The liner of claim 11 wherein at least one of the guide member and the cam assembly is structured to completely guide and control movement of the container closures from the first elevation to the second elevation over a radial distance; wherein the radial distance comprises a lead in radius; and wherein the lead in radius corresponds to a rotation of the star wheel of at least 5 degrees.

15. The liner of claim 11 wherein the guide member includes a first end, a second end, and an arcuate body portion extending between the first end and the second end; wherein the arcuate body portion includes a first edge, a second edge disposed opposite the first edge, a first segment, and a second segment; wherein the first segment has a first radius of curvature; wherein the second segment has a second radius of curvature different than the first radius of curvature; and wherein the guide member is structured to guide the container closures between the first edge and the second edge.

16. The liner of claim 11 wherein the cam assembly includes an inner cam and an outer cam spaced apart from the inner cam to define a space therebetween; wherein the cam assembly is structured to guide and control the movement of the container closures; wherein the cam assembly is structured to move the container closures from a supply point at the downstacker to a transfer point at the processing assembly; wherein the supply point is disposed at a first radius; wherein the transfer point is disposed at a second radius; and wherein the second radius of the transfer point is larger than the first radius of the supply point.

17. The liner of claim 16 wherein the conveyance assembly further comprises a discharge guide structured to discharge the container closures from the processing assembly at a discharge point; wherein the processing assembly comprises a processing turret and a substantially circular cam track; wherein the substantially circular cam track defines a radial processing pathway that extends from the transfer point to the discharge point; and wherein the radial processing pathway extends more than 180 degrees.

* * * * *